Figure 1:
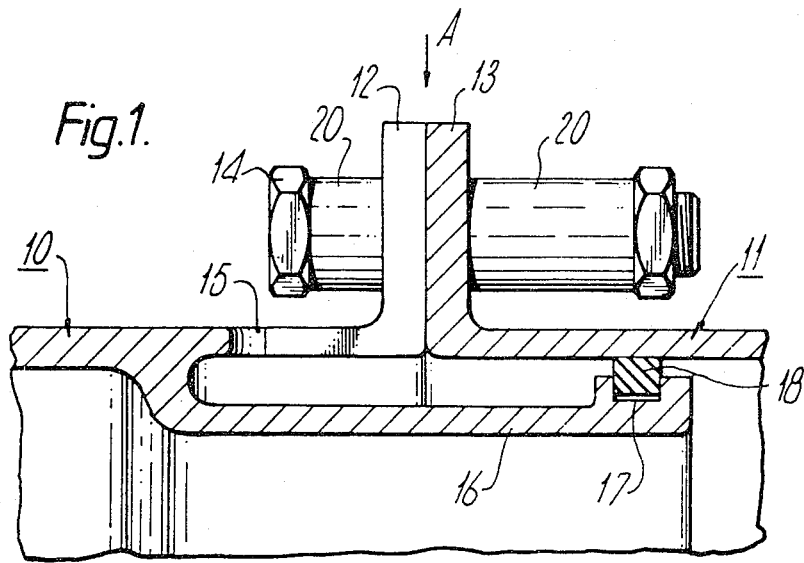

United States Patent [19]

Jones et al.

[11] 4,438,956
[45] Mar. 27, 1984

[54] JOINING OF COMPONENTS

[75] Inventors: Thomas J. Jones; David S. Curtis, both of Bristol, England

[73] Assignee: Rolls Royce Limited, London, England

[21] Appl. No.: 446,256

[22] Filed: Dec. 2, 1982

[30] Foreign Application Priority Data

Dec. 22, 1981 [GB] United Kingdom ............... 8138543

[51] Int. Cl.³ .............................................. F16L 23/02
[52] U.S. Cl. ..................... 285/223; 52/584; 285/238; 285/363; 285/DIG. 6
[58] Field of Search ................... 52/394, 461, 462,584; 285/394, 223, 238, 363, DIG. 6; 428/57, 58

[56] References Cited

U.S. PATENT DOCUMENTS 1,057,939 4/1913 Cooper ........................... 285/368 X
3,991,242 11/1976 Tuttle ................................... 428/57

*Primary Examiner*—Henry F. Epstein
*Attorney, Agent, or Firm*—Parkhurst & Oliff

[57] ABSTRACT

An assembly comprising two components having different thermal coefficients of expansion. Each component is provided with means such as flanges and bolts for securing the components together. At least one of the components is provided with slots in the flange and end portion of the component to impart flexibility thereto. One of the components is provided with a bridging piece which covers the slots to prevent leakage of fluid through the slots, and the bridging piece has a seal that engages the other of the components to form an effective fluid seal.

5 Claims, 4 Drawing Figures

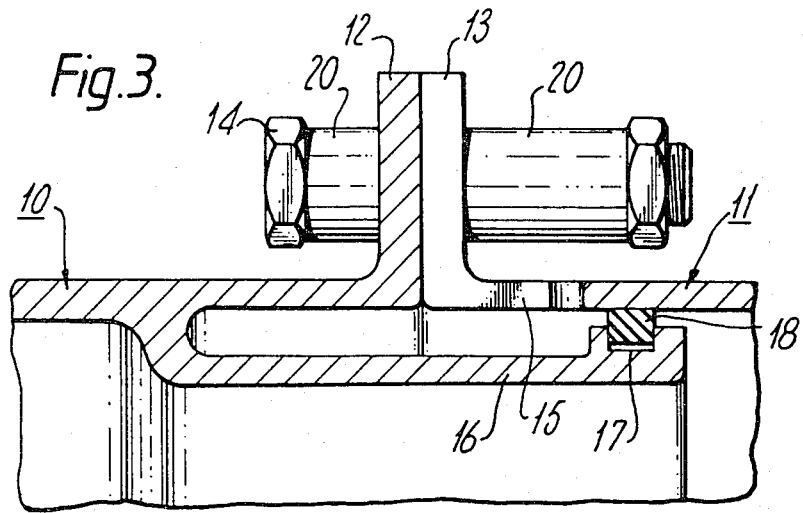
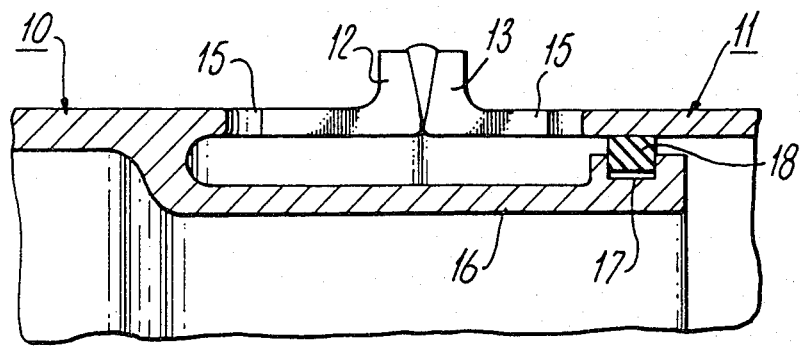

JOINING OF COMPONENTS

This invention relates to a method of joining together components made of different materials that have dissimilar coefficients of thermal expansion.

There are many instances where it is desirable to join together, for example by clamping, bolting, bonding, brazing, soldering or welding, components having dissimilar thermal characteristics.

In the field of gas turbine aero engines there are many instances where it is desirable to use materials having different coefficients of expansion. Take for example vectorable nozzles of the type used on the Rolls-Royce Limited Pegasus engine which is installed in aircraft such as the British Aerospace Harrier Jump Jet or the AV8A or AV8B aircraft. In some applications the upstream parts of the nozzle may be made of nickle based alloys suitable shielded by heat shields, while downstream parts of the nozzle may be constructed of very low expansion materials such as, for example, the material known by the Trade Mark Pyrocarb manufactured by the U.S. Company called Hitco, which comprises a carbon matrix in which is embedded a carbon fiber cloth. The material is prevented from oxidizing either by impregnating the material with silicon and forming silicon carbide, or by the application of non-oxidizing protective coatings. This material has a coefficient of expansion of typically $-0.7 \times 10^{-6}$ in the warp direction and $+3.4 \times 10^{-6}$ in the direction of its thickness (compared with $13.6 \times 10^{-6}$ for nickel based alloys).

In the past it has been difficult, if not impossible, to join components with vastly different coefficients of thermal expansion particularly in those applications where it is desired to maintain a gas tight seal between the components. The problems are more severe with flanged bolted constructions such as thinwalled cylindrical casings where the expansion of one casing radially and axially is constrained by the other with the result that the flanges distort or break or the casings are pulled out of roundness. In some applications such as compressor casings it may be disastrous if the outercasing is pulled so much that the rotor blades strike the casing.

The present invention is applicable to any assembly where there are two or more components joined together and between which relative movement is tolerated while maintaining an effective fluid tight seal.

An object of this invention is to provide a way of joining together components with different expansion characteristics while maintaining an effective seal therebetween and reducing the stress concentration.

The invention as claimed enables thermal movements of one component relative to another by deflecting the slotted part of one component, so that an effective seal is provided by the seal means which reduces the leakage of fluid through the slots, and thereby reduces stress concentrations.

Figure 2:
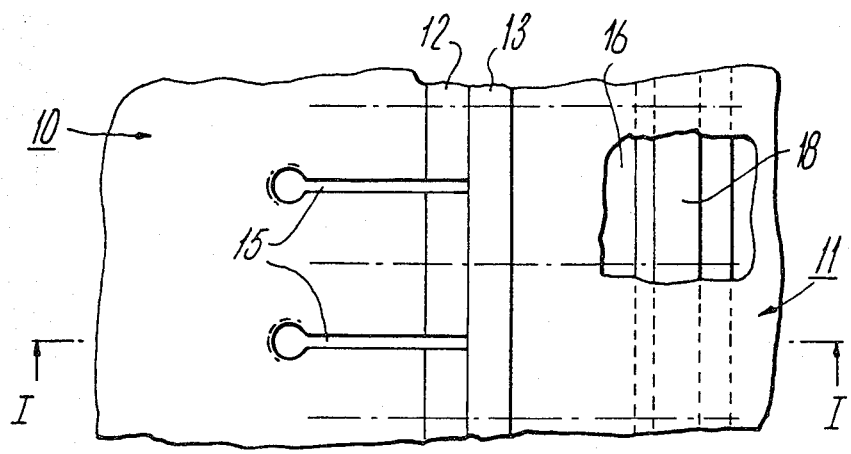

Embodiments of the invention will now be described by way of examples and with reference to the accompanying drawings in which:

FIGS. 1, 3 and 4 illustrates schematically cross-sections with through joints between two components which have different coefficients of thermal expansion, constructed in accordance with the present invention, and, FIG. 2 is a view in the direction of arrow A of FIG. 1.

Referring to FIGS. 1 and 2 of the drawings both components 10,11 are cylindrical casings forming part of an exhaust nozzle of a gas turbine engine and through which the gases flow. Components 10 and 11 each have a radially extending flange 12,13 provided with bolt holes to receive bolts 14. The component 10 is made of a high expansion material such as steel whereas the component 11 is made of Pyrocarb material.

Slots 15 are machined in the flange and end part of one of the components (in the FIG. 2 component 10) and the slotted component 10 is provided with an integral bridging piece 16 that extends beyond the plane of the interface between the flanges 12,13. The length and number of slots 15 are determined by the materials of components 10 and 11 and the function to be performed by the components.

The bridging piece 16 is cylindrical and has at its free end a recess 17 into which a split ring seal 18 is located. The bridging piece 16 is provided on the high expansion component and on expansion the seal is urged into contact with the inner surface of the low expansion materials of component 11. The seal 18 engages the inner circumferential surface of the component 11 to form an effective fluid tight seal that reduces leakage of fluid such as air or gas through the slots 15.

Pyrocarb materials have a negative coefficient of expansion of about $0.7 \times 10^{-6}$ in the directions of the warp of the fabric but a positive coefficient of $3.4 \times 10^{-6}$ in the direction of its thickness, therefore, the expansion of flange 13 in the axial direction (i.e. across its thickness) is likely to be greater than the axial expansion of the cylindrical wall of component 11. The washers 20 are chosen to expand to compensate for expansions of the bolts 14 and maintain clamping loads. The components 10,11 could equally well be clamped by an external clamp around the flanges 12,13.

In some applications the components 10,11 could be brazed, soldered, welded or bonded together instead of bolting or clamping them if the components are made from suitable materials that permit these types of joining.

In the example described above the bridging piece 16 is provided on the component that is slotted. However, while this is to be preferred, it is to be understood that the bridging piece could be provided on the non-slotted component as shown in FIG. 3.

The bridging piece 16 is preferably integral with one of the components 10,11 but it could be made separately.

Referring to the assembly shown in FIG. 4, both components 10,11 are cylindrical, both components 10,11 are slotted and the bridging piece 16 is provided on one of the components 10 but the sealing means 18 engages the other component 11 on the non-slotted portion of the component 11. In this way the cylindrical bridging piece 16 covers the slots 15 in both components 10 and 11. The components 10,11 are not bolted together, although they could be, instead they are joined together by a metallurgical bond such as soldering, brazing or welding (as shown) or by bonding using an adhesive.

The invention may be employed with various combinations of materials for the components 10,11. For example, the invention could be used with metal to ceramic joints such as between aluminum and alumina, metal to metal joints, e.g. nickel based super alloys, or steel alloys to alumium, and metal alloys or ceramics to materials such as Pyrocarb materials, Kevlar (Trade Mark) materials, carbonized fiber reinforced materials, and glass fiber reinforced materials.

We claim:

1. An assembly comprising two components to be secured together and between which relative movement is tolerated wherein each component is provided with means for securing the components together at a joint face, at least one of the components is provided with slots adjacent the joint face to impart flexibility to that component, and one of the components is provided with a bridging piece which extends from the region of its attachment to said one component in a direction that covers the slots and is provided at an end thereof with a seal means that engages with the other component thereby to provide a seal which is operable against the leakage of fluid through the slots.

2. An assembly according to claim 1 wherein both components are slotted.

3. An assembly according to claim 1 wherein one component is slotted and that component is provided with the bridging piece.

4. An assembly according to claim 1 wherein both components are cylindrical casings.

5. An assembly according to claim 4 wherein the means for securing the components together comprises radial flanges on the components and bolts extending through holes in the flanges.

* * * * *